United States Patent [19]
Darst et al.

[11] Patent Number: 5,293,007
[45] Date of Patent: Mar. 8, 1994

[54] METHOD FOR MOMENT BALANCING A PARALLEL BEAM LOAD CELL AND THE ARTICLE PRODUCED THEREBY

[75] Inventors: Timothy J. Darst, Issaquah; Mona L. Mundhenk, Maple Valley, both of Wash.

[73] Assignee: Stress-Tek, Inc., Renton, Wash.

[21] Appl. No.: 862,504

[22] Filed: Apr. 2, 1992

[51] Int. Cl.⁵ .................. G01G 3/08; G01G 19/52; G01L 25/00; G01L 1/22
[52] U.S. Cl. ...................... 177/229; 177/50; 73/1 B; 73/862.634
[58] Field of Search .......... 177/50, 229, 211; 73/1 B, 862.634

[56] References Cited

U.S. PATENT DOCUMENTS

| | | | |
|---|---|---|---|
| 3,968,676 | 7/1976 | Ormond | 73/1 B |
| 4,128,001 | 12/1978 | Marks | 73/1 B |
| 4,150,729 | 4/1979 | Ormond | 177/211 |
| 4,237,727 | 12/1980 | Lockery et al. | 73/862.634 |
| 4,453,609 | 6/1984 | Griffen et al. | 177/211 |

*Primary Examiner*—George H. Miller, Jr.
*Attorney, Agent, or Firm*—Jensen & Puntigam

[57] ABSTRACT

Holes are drilled in the flexure regions of a parallel beam load cell (14), the flexure regions defined by two cut-out portions (26 and 28) which extend between the longitudinal side surfaces (36 and 38) of the load cell (14). The holes extend inwardly of the load cell in the longitudinal side surfaces thereof. The location and depth of the holes are dependent upon the moment balance correction necessary.

13 Claims, 2 Drawing Sheets

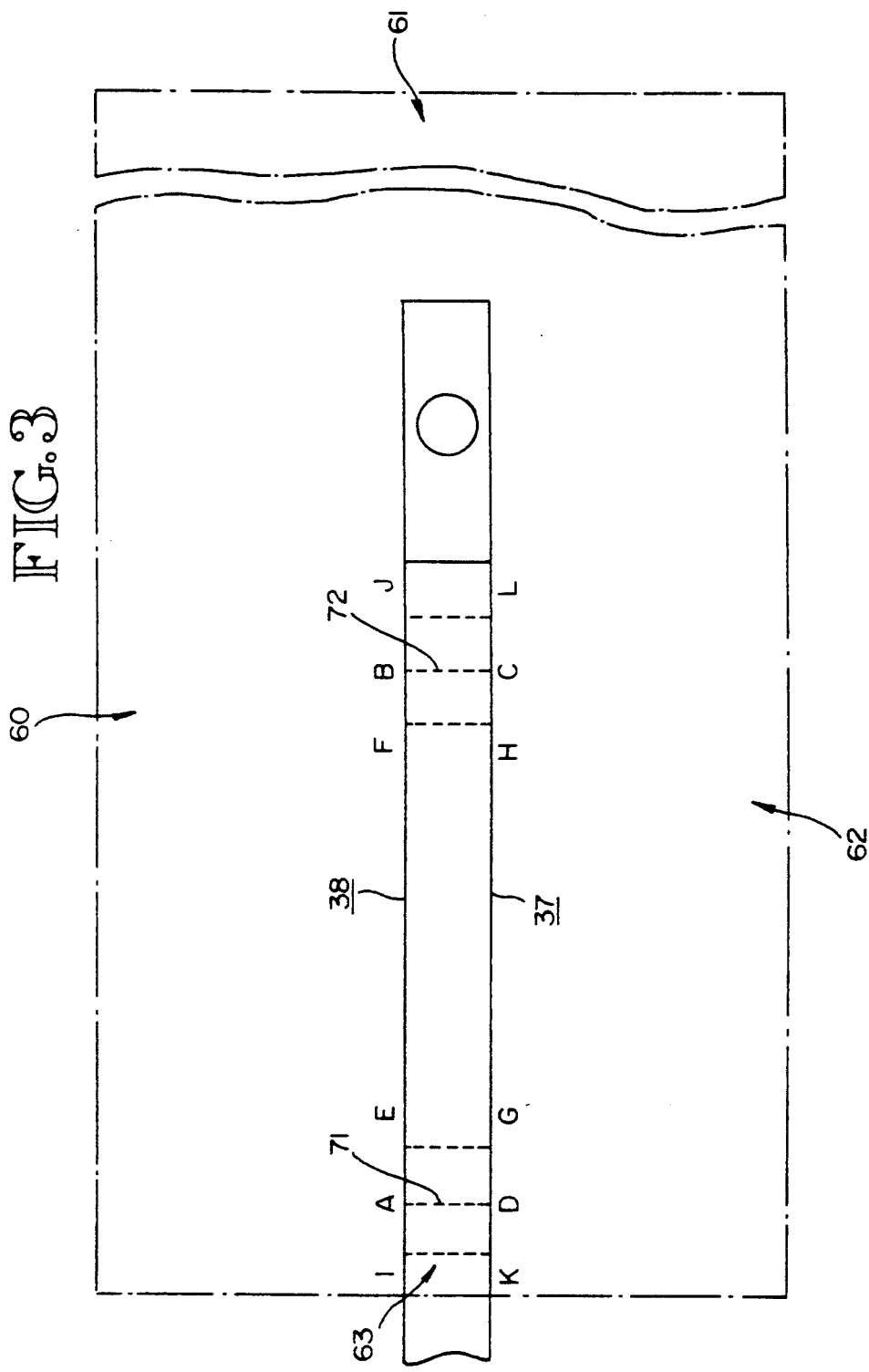

5,293,007

METHOD FOR MOMENT BALANCING A PARALLEL BEAM LOAD CELL AND THE ARTICLE PRODUCED THEREBY

TECHNICAL FIELD

This invention relates generally to the art of parallel beam load cells and more particularly concerns a method, and the product produced thereby, for reducing the sensitivity of a load cell to the position of a load thereon.

BACKGROUND OF THE INVENTION

Platform scales are used for high accuracy (legal for trade) measurement of loads. Such scales typically require an accuracy within 0.05 percent. Parallel beam load cells are frequently used in platform scales as the load sensing element. A typical parallel beam load cell will include two or three beams, with strain-sensitive portions. Strain-responsive elements, such as conventional strain gauges, are mounted on the strain-sensitive portions of the beams to provide, by means of an electrical bridge circuit and follow-on processing circuitry, a readout of the weight of the load on the platform.

One important criteria for such scales is that the indicated weight must be the same, within the required tolerance, regardless of the position of the load on the platform. This is often difficult to achieve.

Various techniques have been used to reduce the sensitivity of the load cell to the position of the load on the platform, otherwise known as moment balancing. The compensating techniques can take the form of electrical compensation and/or structural compensation. U.S. Pat. No. 4,128,001 to Marks is one example of structural compensation. This compensation technique or some variation thereof, is widely used in the art. Marks teaches the removal, typically by filing, of material from the load cell beam, thereby changing the cross-sectional configuration of the beam, to accomplish moment balancing.

The Marks, technique, however, does have disadvantages. A primary disadvantage is that changing the cross-sectional configuration of the beam requires a new zero setting. Thus, the load must be removed, re-zeroing accomplished, and the load then returned after each attempt to moment balance the load cell. In addition, the moment balancing operation must be accomplished prior to the actual completion of the load cell, i.e., before sealing of the load cell is accomplished. Sealing of the load cell, however, can alter the response characteristics of the load cell, thus adding an immediate error to the just-balanced cell. Moment balancing of a parallel beam load cell is thus a time-consuming, and hence expensive, operation.

It is desirable that moment balancing be accomplished following the completion of manufacture of the load cell and in such a manner that the zero position is not significantly affected.

DISCLOSURE OF THE INVENTION

The invention is a method, and resulting product, for reducing the sensitivity of a parallel beam load cell to load position on a load receiving member supported by the load cell, such as the platform in a platform scale. The load cell includes opposing longitudinal side surfaces and strain-sensitive portions on which are mounted strain-responsive elements. The method includes the steps of determining differences in output of the load cell for a plurality of load positions on a load receiving member; and removing load cell material from at least one longitudinal side surface in the vicinity of at least one strain-sensitive portion sufficient to reduce the differences in output relative to load position to a selected level.

BRIEF DESCRIPTION OF THE DRAWINGS

FIG. 3 is a diagram illustrating the method of the present invention.

BEST MODE FOR CARRYING OUT THE INVENTION

Figure 1:
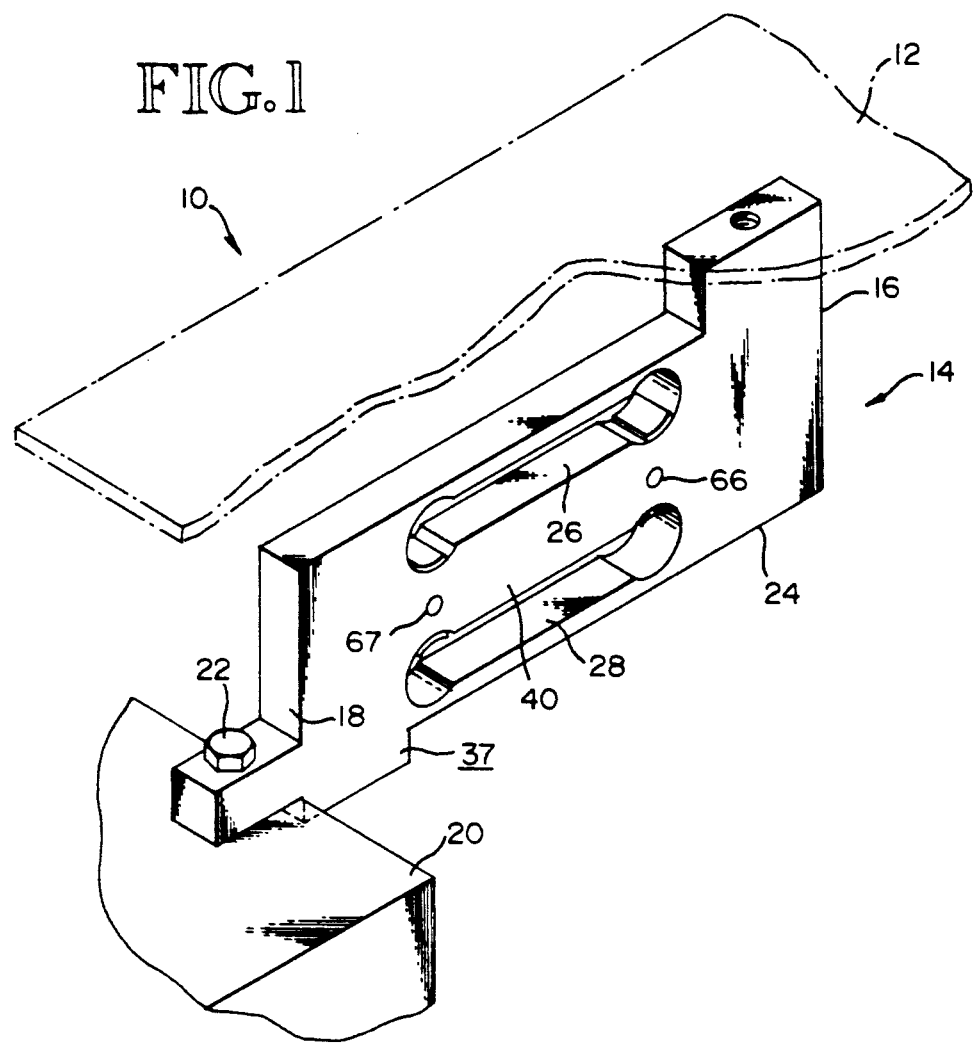
FIG. 1 is a perspective view of a platform scale showing a parallel beam load cell.

FIG. 1 shows a conventional platform scale referred to generally at 10. The platform scale 10 includes a platform 12 upon which a load (not shown) is positioned for weighing in use of the apparatus. Platform 12 may take various configurations and sizes. A typical platform size, for instance, is 2 feet by 2 feet. Supporting platform 12 is a parallel beam load cell, shown generally at 14. Platform 12 is supported by free end 16 of load cell 14, while the other end 18 of load cell 14 is rigidly attached to a base support element 20, such as by a bolt 22 or the like. In the embodiment shown, load cell 14 is configured to have three parallel beams, but it could have other configurations.

Load cell 14 includes a load cell body 24 in which are located upper and lower cut-out portions 26 and 28, with lower cut-out portion 28 positioned directly below upper cut-out portion 26. The outline of the two cut-out portions 26,28 (cut-out portion 26 is exemplary) includes partial circular end portions 30 and 32, joined by straight portions 35 and 36, such that the cut-out portions have a "dumbbell" appearance. Cut-out portions 26 and 28 extend through load cell body 24 between opposing longitudinal side surfaces 37 and 38. In the triple beam load cell of FIGS. 1 and 2, mid-beam 40 is the main load-carrying beam, while beams 42 and 44 are guide beams.

Strain-sensitive elements, i.e., conventional strain gauges, are positioned on the strain-sensitive areas of the beam, i.e., the flexure regions between the two cut-out portions 26 and 28. Strain elements 50 and 56 will be in tension, while elements 52 and 54 will be in compression. A so-called neutral axis 60 is located longitudinally through main beam 42 between the two cut-out portions 26 and 28. The neutral axis 60 defines the boundary line between tension and compression in the beam, i.e. a "zéro" line. Along this line, the beam is neither in tension nor compression.

If the load cell 14 is perfectly symmetrical in structure and composition, and the gauges perfectly matched, then the point of application of a load on the platform will not change the resulting weight readout, since the effect on the strain gauges of varying the position of the load will balance within the four strain gauges, with one pair of gauges increasing in resistance and the other pair of gauges decreasing correspondingly in resistance, so that the resulting weight remains the same. However, in a typical load cell, with typical gauges, a change in load position will result in an unequal resistance change among the gauges and the indicated weight will thus reflect the position of the load on the platform to some extent.

In order to moment balance the output of the load cell with respect to change of position of the load on the platform, the neutral axis of the beam is changed, which changes the response of selected strain gauges to compensate for the action of the load cell as originally configured. This is accomplished in the present invention by removing material from the body of the load cell, in particular the area in the flexure regions of the load cell, i.e. the beam areas between strain gauges 50 and 54 and between strain gauges 52 and 56, on both longitudinal sides of the load cell. In the embodiment shown, there are thus four locations for removal of material. Typically, load cell material is removed by means of a drill which produces an opening inwardly of the load cell body from the opposing longitudinal side surfaces of the load cell. While the drill holes are generally positioned midway on a line extending between the respective centers of each pair of gauges, the actual position of the drill hole can be varied to some extent. In addition, it is possible, although probably not preferable, to have more than one drill hole at a particular location.

The selection of the position in which an opening is drilled depends upon the response of the uncompensated load cell. The first step in the balancing of the load cell is to obtain measurements of a load (the output) at several locations on the platform. Referring now to FIG. 3, this will include the center of the platform and several positions away from the center. In FIG. 3, lines 71 and 72 refer to the center lines of the flexure regions. In the method described below, four additional measurements are made, with the load located at positions 60–63 around the platform. The highest output is used as a target value. This will usually be recorded at position 60 or 62. The output at the other positions will be somewhere in between, including the output recorded at the center. If the output at position 60 is substantially larger than that at position 62, then a hole is drilled at position B, in longitudinal side surface 38, which will decrease the output at position 60 and increase the output at position 62. If it is necessary to make further adjustment after the hole at B is at its maximum depth, a hole is drilled at position A. The load remains on the platform during this time, and thus, drilling can continue until a match is achieved, i.e. within the desired tolerance. When 60 and 62 are matched, the other positions will usually match as well. The deeper the hole (up to one-half the thickness of the beam), the greater the effect. The size of the hole will also affect the result.

Figure 2:
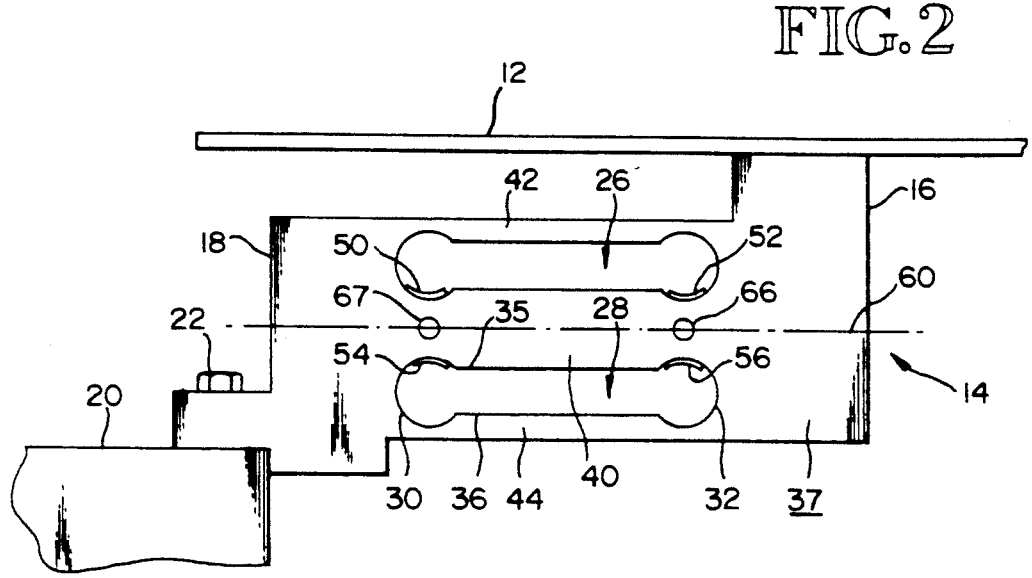
FIG. 2 is a side elevational view of a parallel beam load cell showing the method of the present invention.

When the output at position 62 is substantially greater than at position 60, a hole is drilled at position C in longitudinal side surface 36, as shown at 66 in FIGS. 1 and 2. If it is necessary to continue the effect after the hole at C is at a maximum depth, a hole is drilled at position D, as shown at 67 in FIGS. 1 and 2. When openings are drilled at locations A, B, C or D, one gauge will increase somewhat more than the other decreases.

If the outputs at 60 and 62 are fairly close, but the output at 62 being slightly greater, then a hole is drilled in either position E or F, in longitudinal side surface 38. The output value at location 60 will increase slightly. If the outputs at 60 and 62 are fairly close, but with 60 being slightly greater initially, then a hole is drilled at either position G or H in longitudinal side surface 36. This will produce a slight increase in output at location 62. Holes at positions E, F, G or H are used to make relatively small adjustments, including correction of any over-adjustments made by holes at locations A, B, C and D. The actual moment balancing effect of the holes will, of course, depend to some extent on the configuration of the beam and the particular load cell application. The effect of the holes can also be slightly varied by positioning the holes somewhat off-center in each longitudinal direction, such as, for instance, at I, J, K or L.

During the above process, the weight can remain on the beam. The zero position will not be substantially affected by the moment balancing process. Since the moment balancing process began with a completed load cell, including sealing, no inaccuracies are produced by any further manufacturing steps. Further, by drilling openings in the longitudinal side surfaces, there is no possibility of surface damage to the area of the gauges, and no removed material will come into contact with the gauges, all distinct advantages over the conventional moment balancing process. In addition, the above-described process of moment balancing, sometimes referred to as load cell trimming, can be accomplished automatically or semiautomatically by means of computer control over drilling position and depth. Also, with the above process, load cell accuracies of 0.05 percent can be readily obtained.

While the invention is described herein in the context of a single end, triple beam load cell used for a platform scale application, it should be understood that the method could be used with load cells having a different beam configuration, for instance two beams. Also, the beam could have flexure regions with strain gauges at both ends of the beam. In such a case, the high end is first determined and then moment balanced. The other end is then moment balanced and output matched to the high end. Lastly, the invention could be used with beams in a variety of applications besides platform scales, including scales built into hospital beds and scales for weighing hanging loads, among others.

Although a preferred embodiment of the invention has been disclosed for illustration, it should be understood that various changes, modifications and substitutions may be incorporated in such embodiment without departing from the spirit of the invention, which is defined by the claims which follow.

What is claimed is:

1. A method for reducing the sensitivity of a parallel beam load cell to load position on a load-receiving member associated with the load cell, wherein the load cell includes opposing longitudinal side surfaces and at least two generally opposed upper and lower beam surfaces which extend between the side surfaces, thereby defining at least one beam, wherein the one beam includes reduced vertical dimension portions between the upper and lower beam surfaces at selected locations therealong, defining strain-sensitive flexure regions of said one beam, wherein strain elements are mounted on the beam surfaces in the strain-sensitive regions thereof, the method comprising the steps of:
   determining differences in output of the load cell for a plurality of load positions on the load receiving member; and
   removing load cell material from at least one longitudinal side surface in at least one strain-sensitive flexure region sufficient to reduce the differences in output relative to load position to a selected level.

2. A method of claim 1, wherein the load cell material is removed from only one flexure region.

3. A method of claim 1, wherein load cell material is removed from two flexure regions on the same longitudinal side surface of the load cell.

4. A method of claim 1, wherein the step of removing includes making a hole in the load cell in a longitudinal side surface thereof.

5. A method of claim 4, wherein the hole is produced by drilling.

6. A method of claim 1, wherein the method is accomplished without requiring re-zeroing the output of the load cell.

7. A method of claim 1, wherein the steps of the method are carried out after the load cell has been sealed.

8. A method of claim 1, wherein the plurality of positions includes four positions removed from a center position, two positions being in the same direction as the longitudinal direction of the load cell and two positions orthogonal thereto.

9. A parallel beam load cell, comprising:

a load cell which includes at least two parallel spaced beams and opposing end portions connecting the ends of said beams, said beams having longitudinal side surfaces and upper and lower beam surfaces which extend between the longitudinal side surfaces, wherein at least one end portion is adapted to receive a load-receiving member, wherein at least one of the beams includes reduced vertical dimension portions between the upper and lower beam surfaces, defining strain-sensitive flexure regions of said one beam, wherein a plurality of strain-responsive means are mounted on the beam surfaces of said one beam in the strain-responsive flexure regions thereof, and wherein load cell material has been removed from the longitudinal side surfaces of said one beam in at least on strain-sensitive flexure region to reduce the sensitivity of the load cell to load position on the load-receiving means.

10. An article of claim 9, wherein the load cell includes three parallel spaced beams, arranged such that said one beam is positioned intermediate of two other spaced beams.

11. An article of claim 9, wherein the load cell material is removed by drilling an opening in at least one longitudinal side surface of the load cell.

12. An article of claim 11, wherein the opening is in only one flexure region.

13. An article of claim 9, including openings in two flexure regions in one longitudinal side surface.

* * * * *